(12) United States Patent
Neider et al.

(10) Patent No.: US 6,520,456 B1
(45) Date of Patent: Feb. 18, 2003

(54) PIPE SUPPORTING DEVICES

(75) Inventors: Michael A. Neider, Sandy, UT (US); Nathan M. Sargent, Coalville, UT (US)

(73) Assignee: Miro Industries, Inc., Sandy, UT (US)

( * ) Notice: Subject to any disclaimer, the term of this patent is extended or adjusted under 35 U.S.C. 154(b) by 0 days.

(21) Appl. No.: 09/540,781

(22) Filed: Mar. 31, 2000

(51) Int. Cl.[7] ................................................ F16L 3/00
(52) U.S. Cl. ......................... 248/49; 248/68.1; 248/65; 248/55
(58) Field of Search .......................... 248/55, 49, 65, 248/68.1, 74.1, 73, 69, 66

(56) References Cited

U.S. PATENT DOCUMENTS

| | | | |
|---|---|---|---|
| 827,575 A | * | 7/1906 | Smead ........................ 248/55 |
| 1,788,939 A | * | 1/1931 | Axlund ........................ 248/49 |
| 1,970,840 A | * | 8/1934 | Cardwell et al. ............. 248/55 |
| 2,103,811 A | * | 12/1937 | Davis ........................... 248/55 |
| 2,893,669 A | * | 7/1959 | Kindorf ....................... 248/55 |
| 3,253,416 A | * | 5/1966 | Madison ...................... 248/55 |
| 4,502,653 A | | 3/1985 | Curtis, Jr. |
| 4,513,934 A | | 4/1985 | Pruyne |
| 4,726,222 A | * | 2/1988 | Schueller ...................... 73/65 |
| 4,877,206 A | * | 10/1989 | Barrett ........................ 248/49 |
| 5,028,019 A | | 7/1991 | Hardtke |
| 5,028,149 A | | 7/1991 | Hardtke |
| 5,102,073 A | | 4/1992 | Lestenkof |
| 5,217,191 A | | 6/1993 | Smith |
| 5,685,508 A | | 11/1997 | Smith |
| 5,779,198 A | * | 7/1998 | Rutherford et al. ........... 248/58 |
| 5,829,718 A | | 11/1998 | Smith |
| 5,871,306 A | | 2/1999 | Tilcox |
| 5,906,341 A | | 5/1999 | Brown |
| D427,049 S | * | 6/2000 | Neider et al. ................ D8/380 |

* cited by examiner

Primary Examiner—Kimberly Wood
(74) Attorney, Agent, or Firm—Kenneth E. Horton; Rader, Fishman & Grauer PLLC

(57) ABSTRACT

A device or apparatus that receives and supports a pipe, especially a pipe exposed on a horizontal surface like a roof. The device has a base with a substantially flat bottom for resting on the horizontal surface and a supporting structure with a recess rising from the base to support the pipe. Positioning means are provided in the bottom of the recess to position and center the pipe within the recess. Such a device maximizes the sliding ability of the pipe and minimize erosion of the recess since the pipe rarely abuts the walls of the recess.

18 Claims, 4 Drawing Sheets

PIPE SUPPORTING DEVICES

FIELD OF THE INVENTION

The present invention relates to devices for supporting pipes. In particular, the present invention relates to devices for supporting pipes on horizontal surfaces, such as exterior pipes on roofs.

BACKGROUND OF THE INVENTION

Pipes often run along the roofs in buildings, including commercial buildings, for various purposes such as connecting air conditioning units or other service units that are mounted on the roof. These pipes are often supported above the horizontal surface at intervals along their length by placing supporting mechanisms, like blocks of wood between the horizontal surface and the pipes. When the temperature changes, the pipes expand and contract and often the wood block moves with pipe because, in part, of the large contact surface area between the block and the pipe. Eventually, movement of the block against the roof combined with the weight of the pipe on the wood block causes damage to the roof, resulting in leaks and requiring expensive roof repair. Even if the wood blocks are nailed to the roof, the nails and the wood can deteriorate and the blocks can break loose.

Various types of pipe supporting mechanisms are known in the art. See, for example, U.S. Pat. Nos. 5,906,341, 5,871,306, 5,102,073, 5,028,019, 5,028,149, 5,685,608, 4,502,653, 4,513,934, and 5,829,718, the disclosures of which are incorporated herein by reference. Some of these pipe-supporting mechanisms have a substantially flat-bottomed base and a pipe supporting structure rising from the base that distributes the weight of the pipe over the bottom of the base and thus over the area of the roof in contact with the base. This pipe supporting structure has a recess above the base for receiving and supporting the pipe. A small roller is provided in a trough in the bottom of the recess to facilitate the sliding movement of the pipe.

There are several problems, however, with the types of prior art devices having a small roller in the trough. The small roller is not affixed in the trough and can fall out during shipping or installation of the product. Further, the small roller does not center the pipe within the recess, allowing the pipe to abut the sides of the recess. When the pipe abuts the recess, the ability of the supporting mechanism to facilitate the sliding movement of the pipe is reduced and deterioration of the recess wall (and the pipe) is increased.

SUMMARY OF THE INVENTION

The present invention comprises a device or apparatus that receives and supports a pipe, especially a pipe exposed on a horizontal surface like a roof. The device has a base with a substantially flat bottom for resting on the horizontal surface and a supporting structure with a recess rising from the base to support the pipe. Positioning means are provided in the bottom of the recess to position and center the pipe within the recess. Such a device maximizes the sliding ability of the pipe and minimizes erosion of the recess since the pipe rarely abuts the walls of the recess.

The present invention includes a device for supporting a pipe, the device having a base, a structural member extending upward from the base, the structural member having a recess for receiving the pipe, and pipe positioning means located in a lower portion of the recess. The base may have a substantially flat bottom, such as a bottom with about 80% to about 90% of surface of the bottom comprising a flat area. A portion of the recess may have a u shape or a curvilinear shape so that the pipe will not abut the walls of the recess when placed on the positioning means. The pipe positioning means may be a cylindrical shaft with a sleeve positioned thereon. The device may contain means for restraining the shaft relative to the structural member. The sleeve may be configured to position the pipe away from the side walls by substantially centering the pipe between the side walls. The sleeve may have an outer surface with the diameter of the sleeve at the end portions being larger than the diameter of the sleeve at the middle portion. The smaller diameter in the middle portion may taper to the larger diameter at the end portions and the incline of the taper may substantially match the outer surface of the pipe resting on the sleeve. The restricting means may comprise a collar and a friction bar located in the structural member proximate the ends of the shaft.

The present invention also includes a device for supporting a pipe containing a base, a structural member extending upward from the base with the structural member having a recess for receiving the pipe, pipe positioning means located in a lower portion of the recess, and means for restricting the location of the pipe positioning means relative to the structural member.

The present invention further includes a method for supporting a pipe by first providing a pipe, then providing a device having a base and a structural member extending upward from the base with the structural member having a recess, the device also having positioning means located in a lower portion of the recess, and then placing the pipe within the recess and on the positioning means. The device may be provided with means for restricting the location and size of the pipe positioning means relative to the structural member.

DRAWINGS

FIGS. 1–6 presented in conjunction with this description are views of only particular—rather than complete—portions of the structural member and method of making the same.

DETAILED DESCRIPTION OF THE INVENTION

The following description provides specific details in order to provide a thorough understanding of the present invention, but the present invention can be practiced without employing these specific details. Indeed, the present invention can be practiced by modifying the illustrated device and can be used in conjunction with apparatus and techniques conventionally used in the industry. Indeed, the present invention could be employed in other applications, such as supporting pipes on any substantially horizontal surface, not merely on a roof.

Figure 1:
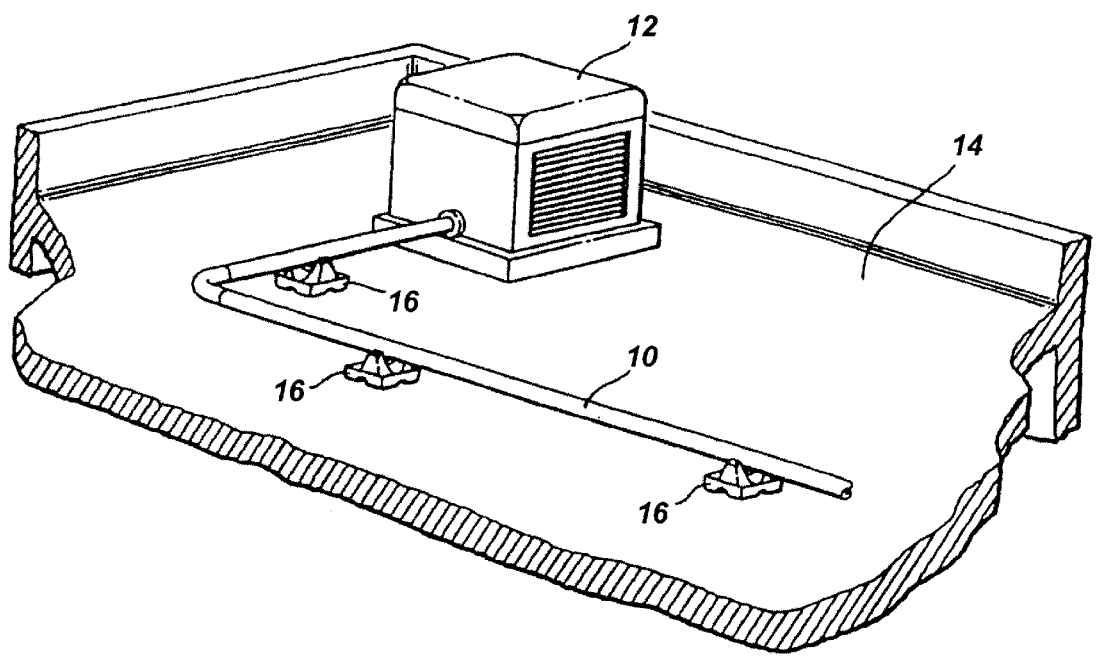
FIG. 1 illustrates a portion of a building roof with an exposed pipe supported by a device of the present invention.

It is common in buildings to have pipes supported above the roof. FIG. 1 shows a common installation for pipe 10 which extends from a service unit 12 (such as an air conditioning unit) across the roof 14 to a location (not shown) over the side of the roof, through the roof, or is connected to other roof-mounted equipment such as other service units. At least one pipe supporting device 16 of the present invention is placed on the roof to cradle and support pipe 10 as it extends along the roof.

The number of pipe supporting devices 16 needed to properly support the pipe depend on several factors. Such factors include the type of pipe used, the size of the pipe, the weight of the pipe, the material of the pipe, the configuration of the pipe on the roof, as well as the material and configuration of the pipe-supporting devices.

Figure 2:
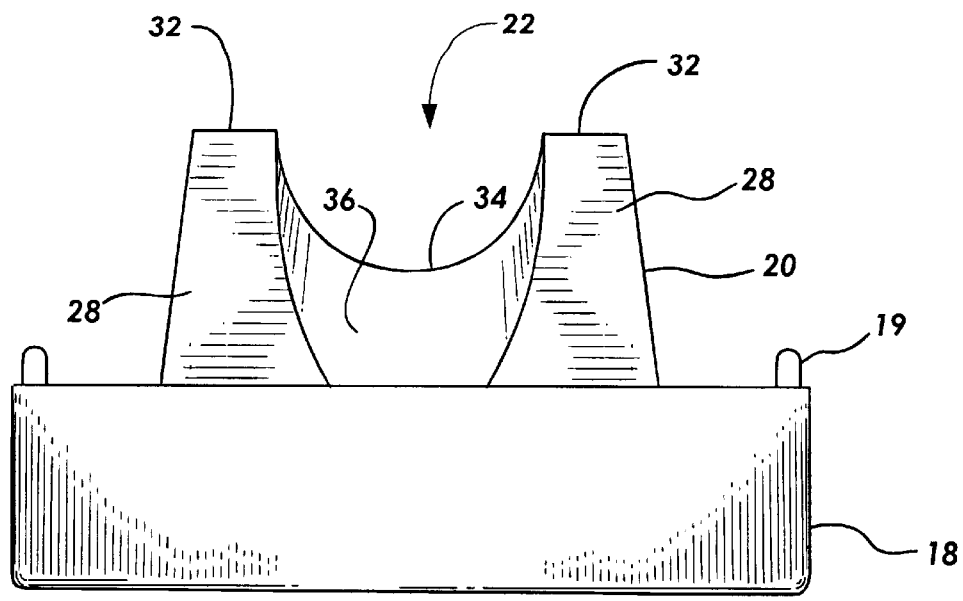
FIG. 2 illustrates a front view of a pipe-supporting device of the present invention.

FIGS. 2–6 illustrate several configurations of pipe-supporting device 16. As shown in FIG. 2, each pipe-supporting device 16 includes a base 18 with support structure 20. The height of pipe-supporting devices 16 generally ranges from about 2 inches to about 4 inches. Preferably, the height of pipe-supporting devices 16 is about 4 inches. The pipe-supporting devices 16 can be stacked on one another via stacking pins 19 to support pipes at different heights. The pipe-supporting device can also be placed side-by-side to support multiple pipes.

Base 18 of pipe-supporting device 16 can be of any suitable configuration known in the art. Suitable configurations include those which evenly distribute the weight of the pipe such as round, triangular, rectangular, square, hexagonal, octagonal, etc . . . As known in the art, base 18 can optionally serve as a pitch pan for holding pitch that is poured therein to act as a sealant for nails or screws that are used to connect base 18 to roof 14.

The size of base 18 can be any size providing the needed structural integrity for device 16. The dimension of base 18 can range (for example, when the base is substantially square) from about 6 inches by about 6 inches to about 7½ by 7½ inches. Preferably, base 18 has a substantially square base with dimensions about 7½ by 7½ inches.

The pipe-supporting device 16 of the present invention provides substantially even distribution of the pipe weight over base 18. The bottom of base 18, therefore, should be configured in any desired manner to maximize support for the pipe-supporting apparatus. Thus, at least one portion of the bottom of base 18 has a substantially flat bottom. Further, the bottom of base 18 has a substantially flat peripheral area contacting the roof surface. Preferably, the bottom of base 18 should be configured to provide maximum surface area between base 18 and roof 14. For example, about 75% to about 80% of the bottom of base 18 could be configured to contact roof 14.

Figure 4:
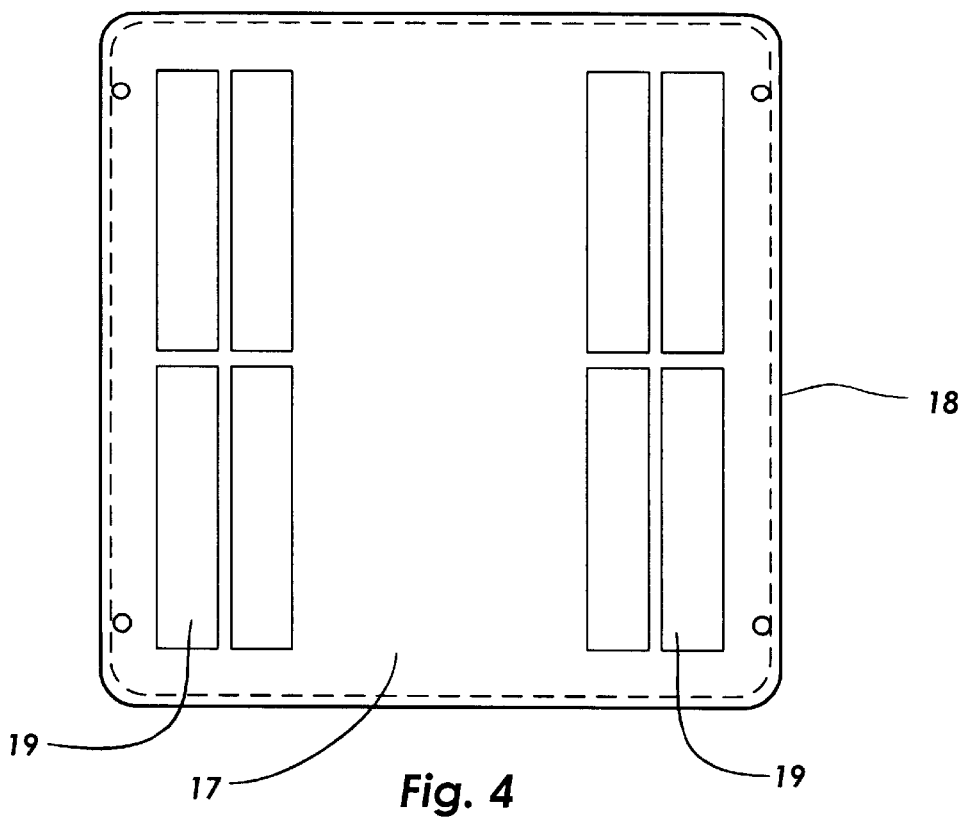
FIG. 4 illustrates a bottom view of a pipe-supporting device of the present invention.

One preferred example for maximizing this surface area is illustrated in FIG. 4. As seen in FIG. 4, the flat area 17 of base 18 contacting the horizontal surface is maximized in all areas except for empty areas 19 under support structure 20 which are present because of limitations during the molding process used to make device 16. The substantially flat area 17 is maximized, thereby minimizing the pipe weight per unit area of base 18, e.g., to a value at least less than the breaking point or tensile strength of the roof or horizontal surface, for example, less than about 5 lbs/in$^2$. If desired, the bottom of base 18 can be formed so that channels and drain holes are provided therein, as described in U.S. Pat. No. 4,502,653, the disclosure of which is incorporated herein by reference.

The corners of base 18 are substantially rounded and may be turned up so that they will not gouge the roof surface if supporting device 16 slides along the roof. The edges of base 18 can also be substantially rounded and raised from the horizontal surface on which they are placed to avoid gouging that surface. The height the corners and edges are raised ranges from about ½ inch to about 2 inches. Preferably, the edges of the base 18 are raised about ½ inches from the horizontal surface.

Support structure 20 extends from base 18 and cradles pipe 10. Support structure 20 can have any suitable configuration providing the necessary structural integrity, including those known in the art. Suitable configurations include any of those which connect with base 18 at the bottom and provide an upper surface for cradling the pipe. Preferably, support structure 20 is substantially square where it joins base 18 and provides a recess (or pocket) 22 at the top for receiving the pipe to be supported. Supporting structure 20 can be formed by end walls 24 which extend upwardly from base 18 along their ends 26 and by side walls 28 which extend upwardly from base 18 along sides 30 to form tapered towers 32 at opposite sides of recess 22.

Figure 3:
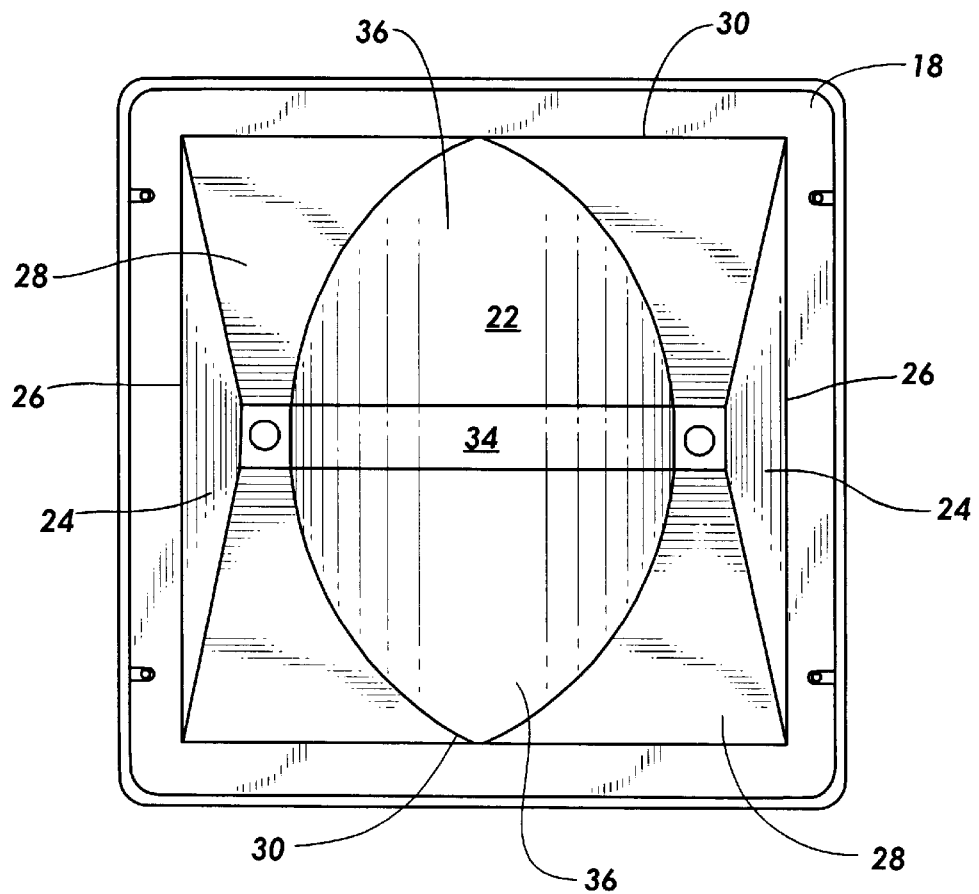
FIG. 3 illustrates a top view of a pipe-supporting device of the present invention.

One configuration of recess 22 is illustrated by FIGS. 2 and 3. The tops of recess 22 are located at the apex of towers 32, with a recess top 34 running therebetween. The configuration and size of recess top 34 is selected to allow the desired type and size of pipe while excluding undesired types and sizes. As illustrated in the Figures, recess top 34 is curved in the vertical dimension while being substantially flat in the horizontal direction. Recess 22 is further defined by recess side walls 36. Providing the recess with recess side walls 36 defining the recess allows the supporting device 16 to be used on sloping roofs or with a sloping pipe yet distributes substantially equal weight of the pipe over the flat base area of device 16.

Support structure 20 and base 18 can be manufactured of any suitable material known in the art, such as plastic materials, rubber materials, or metals. Preferably, the support structure 20 and base 18 are molded from a polycarbonate resin (PR) with additives to make it resistant to ultraviolet light. The thickness of the walls in these components, when they are made of PR, can range from about $\frac{1}{10}$ to about $\frac{1}{8}$ inches. Preferably, the thickness is about $\frac{1}{8}$ inches when supporting pipes up to 100 pounds per pipe supporting device. Other materials may require different wall thickness for similar loads.

Recess 22 can be configured for the expected size (e.g., diameter) of the pipe to be supported. Thus, the diameter of the recess ranges from about 1 inch to about 4 inches to support pipes ranging from about ½ to about 2¾ inches in diameter. For example, the diameter of the recess is about 3 and ⅞ inches when supporting a pipe with a diameter of about 3¾ inches.

The shape of recess 22 should be configured to accommodate the shape and size of the pipe. Accordingly, the shape of the recess can be substantially a u-shape or curvilinear shape. The angle of incline of the u-shape or curvilinear shape can be modified for the size and shape of the pipe as well as for the structural integrity of device 16.

In a normal position, supported pipe 10 will fit into recess 22 and rest, as described below, on positioning means without touching the walls of the recess. Recess 22 is necessary to ensure that the supporting device 16 remains in position with respect to the pipe upon lateral movement of the pipe or upon lateral movement of the supporting device. Thus, if the pipe being supported moves laterally, it will contact the recess edge and move the supporting device along the roof with it. If the supporting device 16 is secured to the roof, the edge of the recess will hold the pipe against substantial lateral movement. For this reason, it is preferred that the recess be formed as illustrated rather than as a larger flat surface.

In certain pipe-support devices known in the art, a trough was formed in the bottom of recess 22 to receive a roller therein. See, for example, U.S. Pat. No. 4,502,653, the disclosure of which is incorporated herein by reference. Generally, the roller extended along the bottom of recess 22 and the trough was configured to provide a surface against which the roller could rotate. Unfortunately, there was no means for retaining the roller in the trough. Moreover, the roller often did not properly position the pipe within recess 22, allowing pipe 10 to abut and rub the walls of recess 22.

Figure 5:
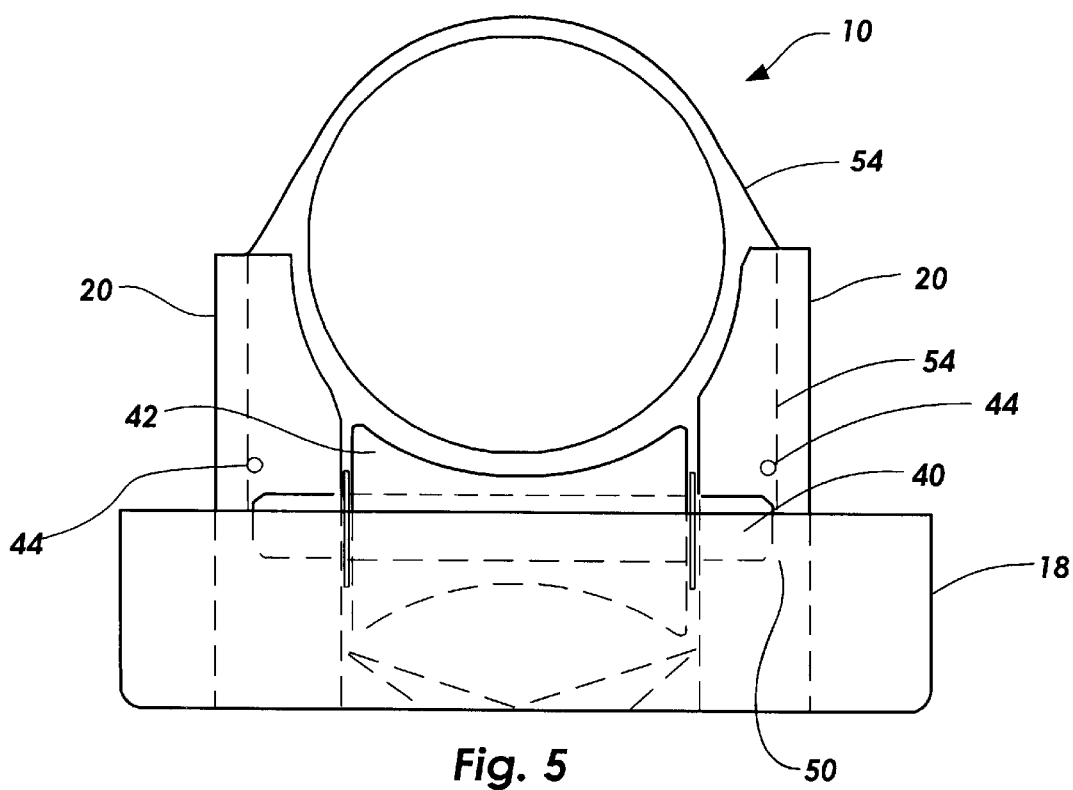
FIG. 5 illustrates a front view of pipe being supported by a pipe supporting device of the present invention.

In the present invention, positioning means are located in the bottom of recess 22. The positioning means serves several functions, including supporting the pipe 10 and allowing it to move in the pipe's axial direction. The positioning means also help distribute the weight of the pipe. Importantly, the positioning means also positions the supported pipe in a transverse direction between the walls of recess 22 as illustrated in FIG. 5. Preferably, positioning means centers pipe 10 in the transverse direction so that the pipe does not contact or abut the recess walls.

Preferably, the positioning means illustrated in FIG. 5 is employed in the present invention. The illustrated positioning means includes a shaft 40 on which sleeve 42 rotates. To accommodate the positioning means illustrated in FIGS. 5 and 6, recess 22 is modified as shown. For other positioning means, recess 22 can be altered to allow for the specific configuration of the positioning means.

Figure 6:
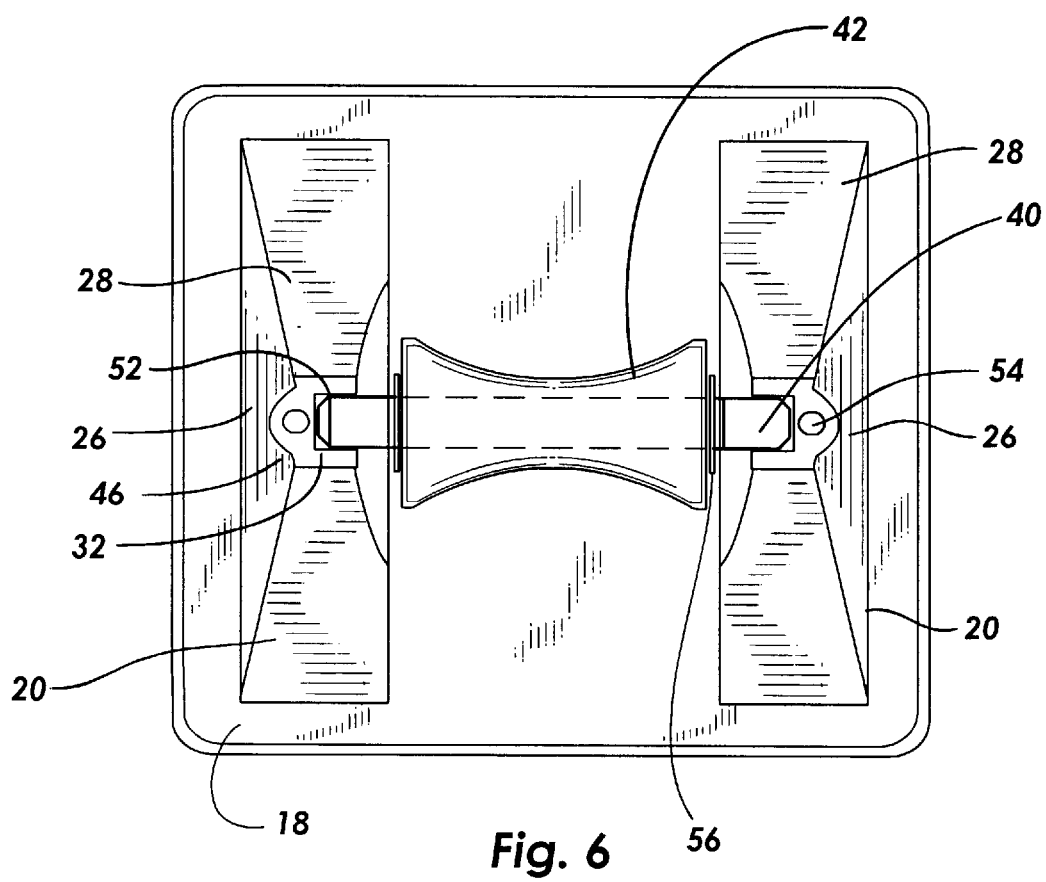
FIG. 6 illustrates a top view of pipe being supported by a pipe supporting device of the present invention.

In FIGS. 5 and 6, shaft 40 can have any desired configuration which provides a surface on which sleeve 42 rotates. Preferably, the shaft has a cylindrical shape with a circular cross section having a diameter ranging from about 1 inch to about 3 inches and a length depending on the size of recess 22. Preferably, shaft 40 has a diameter of about 9/16 inches.

The shaft is constructed of any suitable material known in the art. Suitable materials include those which minimize friction and resistance between the shaft and the sleeve, such as steel, stainless steel, or plastic materials. Preferably, stainless steel or glass-filled nylons are employed as the material for the shaft.

The ends of shaft 40 are held in place by any suitable restricting means located in recess 22. The restricting means insure that the shaft (and consequently sleeve 42) are fixed relative to recess 22 and do not fall out during transport or installation. One restricting means includes collar 46 formed in the side wall adjacent the shaft 40, such as that illustrated in FIGS. 5 and 6. Collar 46 comprises lower wall 50 and side wall 52 in which the end of shaft 40 rests. To place the shaft 40 (with sleeve 42 already placed thereon) into pipe-supporting device 16, the sleeve 42 is pushed down through collar 46. Once pushed onto lower wall 50, the end of shaft 40 is locked into place by ribs or protrusions 44 in side wall 52 immediately above shaft 40. If necessary, the shaft 40 can also be kept in place by strap 54 which extends around and encircles pipe 10.

Sleeve 42 can be of any suitable configuration with an inner surface rotating around the outer surface of shaft 40 and with the sleeve outer surface supporting and positioning the pipe. An optional washer 56 can be placed on shaft 40 between sleeve 42 and recess 22. Preferably, the sleeve 42 has a shape where the end portions have a diameter larger than the middle portions. Alternatively, the sleeve can contain more than one component provided that the component (s) located near the end of the shaft 40 are larger in diameter than the component(s) located proximate the middle of the shaft 40. More preferably, the sleeve employed in the present invention is a single component with a small diameter in the middle which tapers to a larger diameter at the ends, as illustrated in FIGS. 5 and 6. The specific smaller and larger diameters, as well as the degree of the taper, depends on the size of the pipe to be supported.

The sleeve 42 is constructed from any suitable material known in the art. Suitable materials include those which are resilient enough to not be deformed by the pipe yet which minimize friction with the shaft and with the pipe. Suitable materials include plastic materials, such as polycarbonate, TEFLON (fluoropolomers), or glass-filled nylons. Preferably, polycarbonate resin is employed as the material for the sleeve.

The pipe supporting device 16 of the present invention can have alternative configurations. For example, it could have more than one shaft/sleeve combination—such as successive shaft/sleeves in the axial direction—used as the positioning means. Additionally, the pipe supporting device could have more than one recess, each with its own positioning means, placed in series (to support adjacent portions of a pipe) or in parallel (to support pipes running side-by-side). Additional structural supports, such as cross-supports 58 which help distribute the pipe weight, can be added to the pipe supporting device of the present invention to increase the structural integrity thereof.

Having described the details of the present invention, the invention defined by the appended claims is not to be limited by the above details, as many apparent variations thereof are possible without departing from the spirit or scope thereof.

We claim:

1. A device for supporting a pipe on a substantially horizontal surface, comprising:
    a base;
    a structural member extending upward from the base, the structural member having a curvilinear recess for receiving the pipe; and
    pipe positioning means located in the recess;
    wherein the pipe positioning means comprises a shaft with a sleeve positioned thereon.
2. The device of claim 1, wherein the shaft has a cylindrical configuration with a circular cross-section.
3. The device of claim 1, wherein the sleeve is configured to position the pipe away from the side walls.
4. The device of claim 3, wherein the sleeve is configured to substantially center the pipe between the side walls.
5. The device of claim 4, wherein the sleeve has an outer surface with the diameter of the sleeve at the end portions being larger than the diameter of the sleeve at the middle portion.
6. The device of claim 5, wherein the smaller diameter in the middle portion tapers to the larger diameter at the end portions.
7. The device of claim 6, wherein the incline of the taper substantially matches the outer surface of the pipe resting on the sleeve.
8. The device of claim 1, wherein the structural member comprises polycarbonate or a UV resistant additive.
9. A device for supporting a pipe on a substantially horizontal surface, comprising:
    a base;
    a structural member extending upward from the base, the structural member having a curvilinear recess for receiving the pipe;

pipe positioning means comprising a shaft with a sleeve positioned thereon located in the recess; and means for restraining the shaft vertically relative to the structural member.

10. The device of claim 9, wherein the means for restraining comprises a collar located in the structural member proximate the ends of the shaft.

11. The device of claim 10, wherein the means for restraining comprises a strap encircling the pipe.

12. A method for supporting a pipe, the method comprising:

providing a pipe;

providing a device containing a base, a structural member extending upward from the base and having a curvilinear recess, and pipe positioning means located in the recess; and placing the pipe within the recess and on the positioning means;

wherein the pipe positioning means comprises a shaft with a sleeve positioned thereon.

13. The method of claim 12, further comprising providing the device with means for restricting the location of the pipe positioning means relative to the structural member.

14. The method of claim 12, wherein the base or structural member includes a UV resistant additive.

15. The method of claim 12, wherein the base or structural member comprises polycarbonate resin.

16. A device for supporting a pipe comprising:

a base comprising polycarbonate resin;

a structural member extending upward from the base, the structural member having a curvilinear recess for receiving the pipe; and pipe positioning means located in the recess;

wherein the pipe positioning means comprises a shaft with a sleeve positioned thereon.

17. The device of claim 16, wherein the structural member comprises a polycarbonate resin.

18. The device of claim 16, wherein the polycarbonate resin base and the structural member comprise a UV resistant additive.

* * * * *